United States Patent [19]

Hood et al.

[11] 4,199,913

[45] Apr. 29, 1980

[54] ORCHARD FRUIT HANDLING SYSTEM

[75] Inventors: Clarence E. Hood; Carl M. McHugh, both of Clemson, S.C.; Fletcher G. Hawkins, Crossville, Tenn.

[73] Assignee: Clemson University, Clemson, S.C.

[21] Appl. No.: 966,618

[22] Filed: Dec. 5, 1978

[51] Int. Cl.² .................... B65B 1/06; A01D 61/02; A01D 46/22
[52] U.S. Cl. .................... 53/244; 53/248; 53/391; 56/16.6; 56/327 R; 56/328 R
[58] Field of Search ............ 53/244, 247, 248, 391; 56/328 R, 327 R, 16.6 R, 63, 171; 414/467

[56] References Cited

U.S. PATENT DOCUMENTS

| | | | |
|---|---|---|---|
| 2,482,383 | 9/1949 | Traverso | 56/328 R |
| 2,757,503 | 8/1956 | Hart | 53/591 |
| 3,292,806 | 12/1966 | Maag | 56/328 R X |
| 3,485,026 | 12/1969 | Davis | 56/328 R |
| 3,543,486 | 12/1970 | Bull | 56/328 TS |
| 3,597,909 | 8/1971 | Lauridsen et al. | 56/327 R |
| 3,842,573 | 10/1974 | Price | 53/244 X |
| 3,968,842 | 7/1976 | Puch, Sr. et al. | 53/391 X |
| 3,981,127 | 9/1976 | Smith | 56/328 R |

*Primary Examiner*—Horace M. Culver

*Attorney, Agent, or Firm*—Wellington M. Manning, Jr.; Luke J. Wilburn, Jr.

[57] ABSTRACT

Orchard fruit handling apparatus for conveying and delivering harvested fruit into a plurality of storage bins comprising a first conveyor for adjustable attachment to a conventional farm tractor for receiving and transporting fruit received thereon in a generally linear direction rearwardly of the tractor, and trailer means for attachment to the tractor containing a second conveyor for receiving harvested fruit from the first conveyor and selectively directing the fruit into a plurality of storage bins carried on the trailer. A plurality of deflecting blades or bars are selectively positionable across the second conveyor to selectively intercept and deflect the fruit into corresponding bin filler mechanisms located along the side of the second conveyor and above corresponding collection bins. Each bin filler mechanism forms a sinuous passageway for gravitationally directing the fruit downwardy into a collection bin and is vertically positionable to maintain its lower fruit discharge outlet at the upper level of the fruit being collected in the storage bin. The trailer is provided with means for gravitationally discharging the filled fruit storage bins on to the ground at a central location in the orchard, and the orchard fruit handling apparatus is powered by connection to the hydraulic and electrical systems of the conventional farm tractor.

9 Claims, 6 Drawing Figures

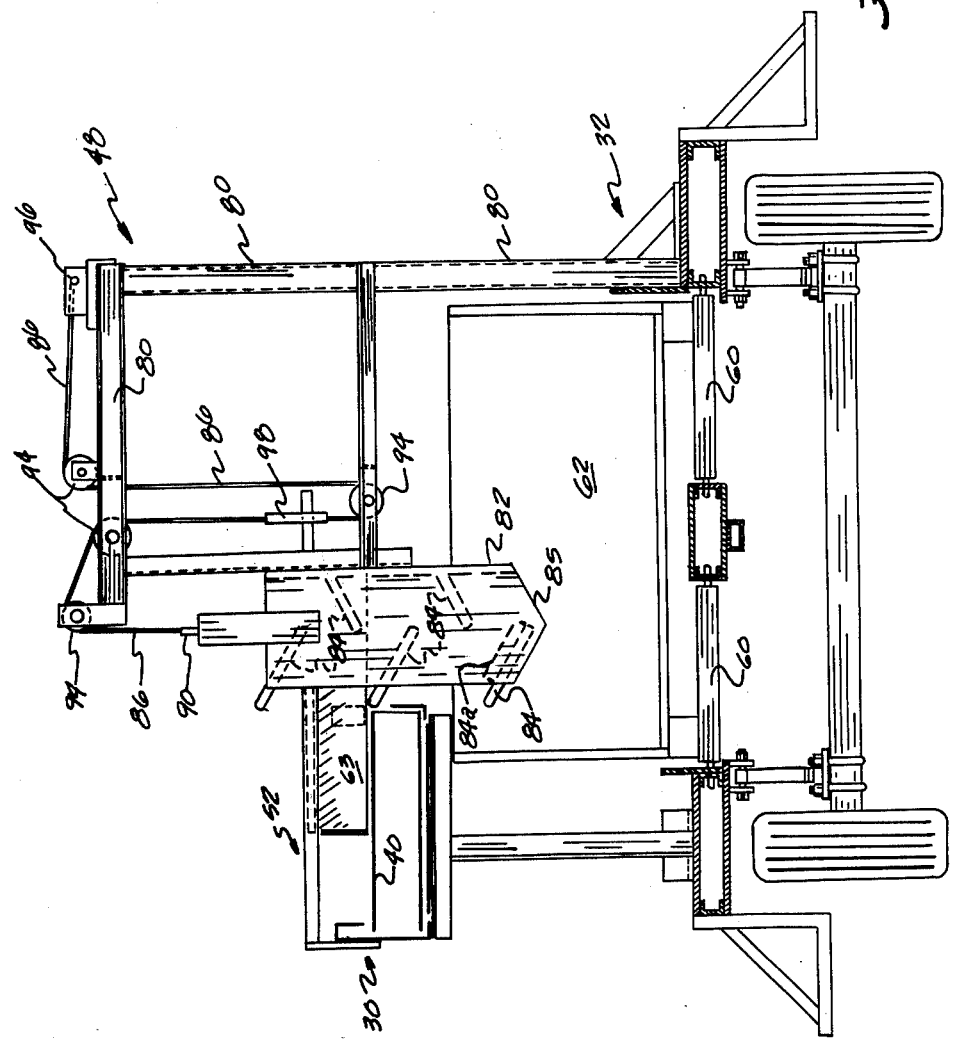

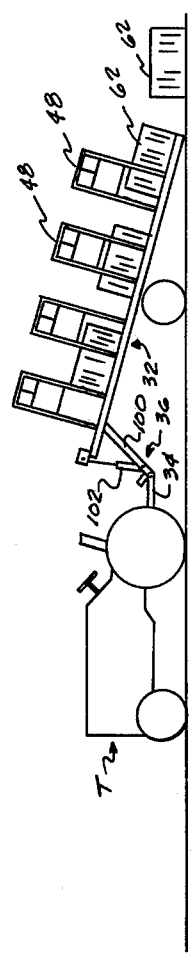
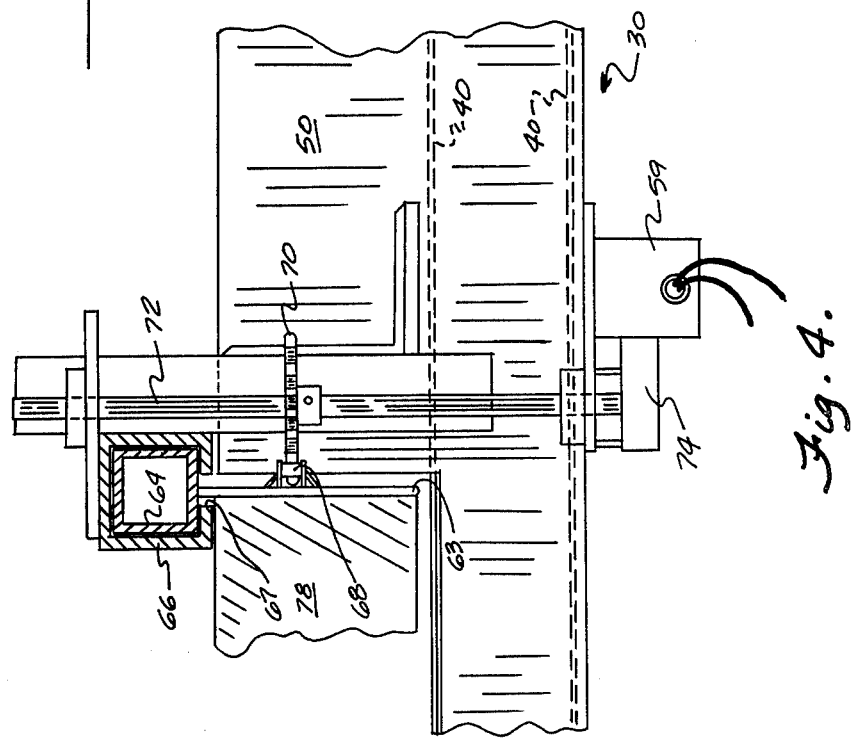

ORCHARD FRUIT HANDLING SYSTEM

The invention relates to orchard fruit handling apparatus and, more particularly, to mobile apparatus adapted to receive harvested fruit in an orchard location and to automatically convey the harvested fruit selectively into one or more of a plurality of storage bins carried by the apparatus, with minimum damage and brusing of the fruit by the conveying mechanism of the apparatus. The mobile fruit handling apparatus is particularly adapted for attachment to and transportation by a conventional farm tractor which is driven behind a conventional, motorized fruit harvester during the harvesting operation.

BACKGROUND OF THE INVENTION

Many commercial, mechanical fruit harvesters for orchard fruit are designed for carrying only a single, large, bulk bin for storage of the fruit during the harvesting operation. Such bins must be periodically removed when filled and an empty one placed on the harvester. This harvester bin change procedure consumes an appreciable amount of time in the overall harvesting procedure, e.g., approximately 20 percent of the time it takes to fill a bin. Although commercial, self-propelled equipment is available to transport fruit receiving bins, they are generally quite expensive and do not allow for bin filling while following a harvester.

For convenience and economy of farming operations for the commercial grower, it is highly desirable to employ, if possible, existing farm tractor and trailer equipment typically available on farms to collect and transport orchard fruit after harvesting.

OBJECTS OF THE INVENTION

It is, therefore, an object of the present invention to provide an orchard fruit handling apparatus for collection and storage of harvested fruit in bins for subsequent processing which apparatus may be transported and powered by a conventional farm tractor.

It is another object to provide an orchard fruit collection apparatus which may be employed in connection with a conventional powered fruit harvester equipment to receive the fruit therefrom and to automatically collect the fruit in a plurality of bins for subsequent transportation to a central collection area or site in the field.

It is a more specific object to provide an improved orchard handling and collecting apparatus which provides for multiple filling and transportation of a plurality of storage bins for the fruit to and from the harvesting site to a collecton site, and wherein the apparatus may be transported and operated from a conventional farm tractor with minimum use of manual labor.

It is another object to provide an improved fruit collection and bin storage apparatus which automatically conveys and collects fruit in a plurality of stoarage bins with minimum bruising or damage of the fruit during the collection process.

The above as well as other objects of the present invention will become more apparent from the following detailed description of a preferred embodiment of the invention.

BRIEF DESCRIPTION OF THE INVENTION

The apparatus of the present invention is particularly adapted for operation from and transportation by existing farm tractors of the conventional type and comprises conveying means including a first conveyor mechanism for attachment to a side of a farm tractor to receive fruit from the output conveyor of a mechanical harvester, and a trailer which is pulled by the tractor and includes a second conveyor mechanism for receiving the fruit from the first conveyor mechanism and for selectively directing the fruit into one or more of a plurality of storage bins carried on the trailer. When the storage bins have been filled with fruit, the tractor then conveys the bins to a packing house or central collection point for unloading. The trailer is provided with means for automatically unloading the bins from the fruit handling apparatus in a rapid and efficient manner, whereby the trailer may be reloaded with empty bins and conveyed again by the tractor to the harvesting point for refilling.

The invention will be better understood from the following detailed description of a preferred embodiment thereof, when taken with the accompanying drawings, in which:

FIG. 1a is a reduced, schematic side elevation view of FIG. 1 illustrating the means for adjustably positioning the first conveyor mechanism;

FIG. 3 is a right-end schematic elevational, view of the trailer of FIG. 2, with portions in section, showing one of the bin filler mechanisms of FIG. 2; and FIG. 4 is an enlarged transverse sectional view of a fruit deflector plate mechanism for the trailer conveyor, taken generally along line IV—IV and looking in the directon of the arrows, as seen in FIG. 2;

FIG. 5 is a reduced schematic side elevation view of the tractor and trailer of FIGS. 1 & 2, showing the position of the trailer during bin unloading operations.

Figure 1:
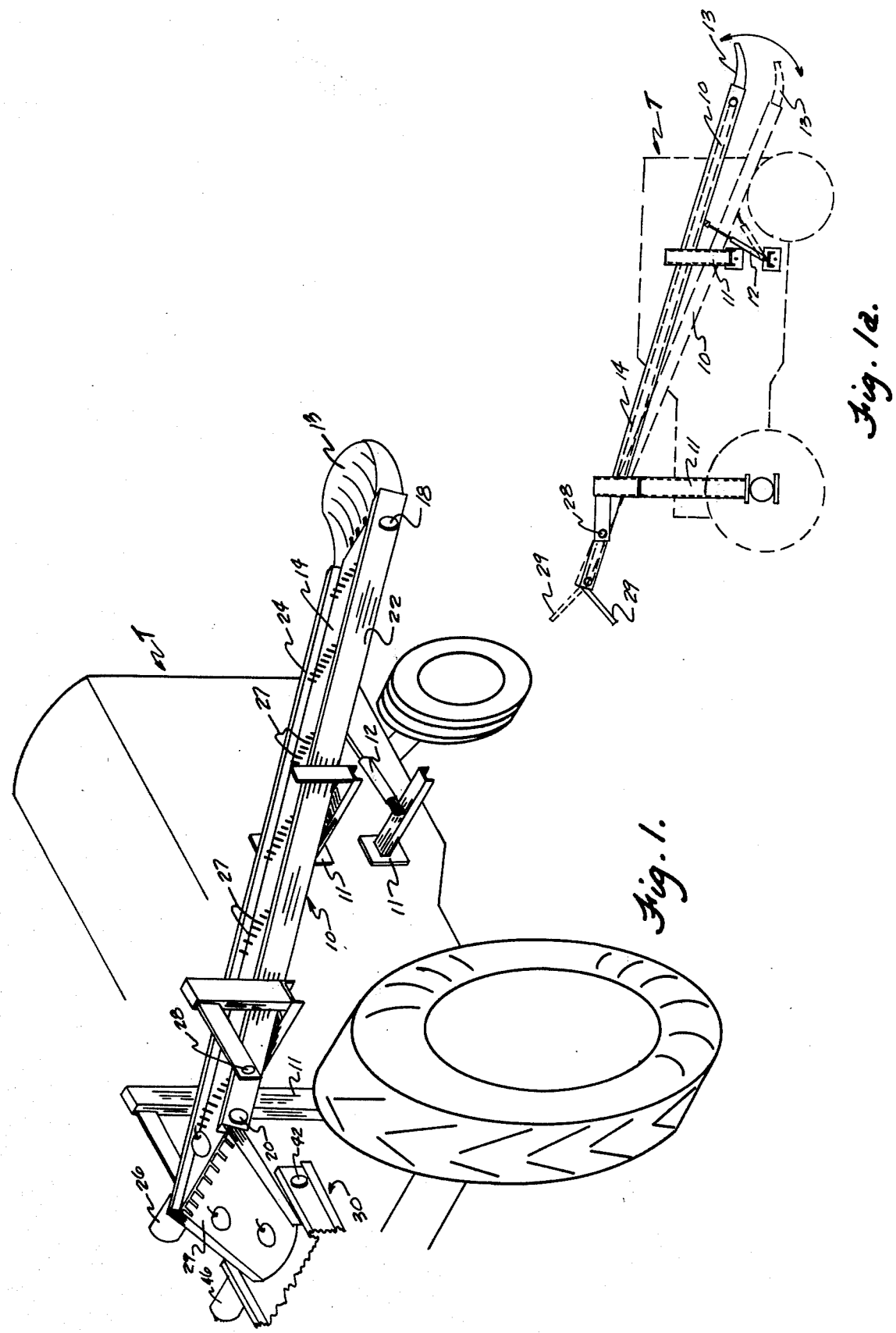
FIG. 1 is an overall schematic perspective view of a first conveyor mechanism of the apparatus which is adapted to be carried by and extend along the side a conventional farm tractor for receipt of fruit from a mechanical fruit harvester.
Figure 2:
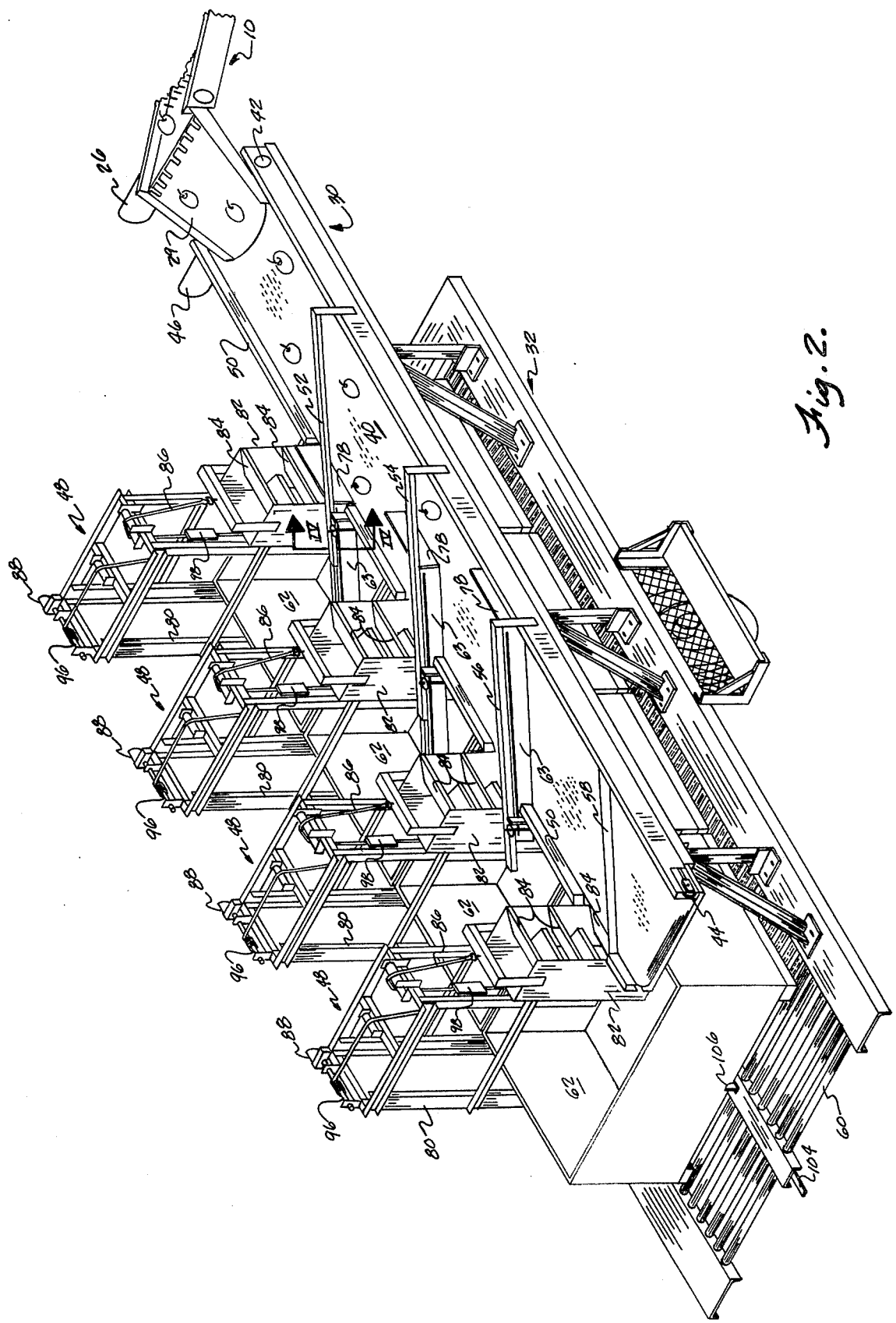
FIG. 2 is an overall schematic perspective view of a trailer with conveyor and associated bin fillers and bulk bin storage means in accordance with the present invention.

Referring more specifically to the drawings, FIGS. 1 and 2 illustrate collectively the orchard fruit handling apparatus of the present invention. As seen in FIGS. 1 and 1a, the apparatus comprises a first conveyor section 10 which is adjustably attached by suitable frame members 11 and hydraulic lifting piston and cylinder 12 to the side portion of a conventional tractor T which serves as a prime mover for the fruit handling apparatus and also supplies hydraulic and electrical power for operation of the various components of the fruit handling apparatus, as will be explained. Conveyor section 10 includes a generally scoop-shaped collector portion 13 which receives harvested fruit, such as apples, peaches or the like, from a supply source, such as the discharge conveyor of a conventional, mechanical fruit harvester (not shown). As seen, the conveyor 10 is composed of an endless flexible belt 14 which extends along the length of the side of the tractor T and is supported for movement in a rearward direction on rotatable rollers 18, 20. Conveyor section 10 has upstanding side walls 22, 24 on each side of the belt and the belt is driven by means of a hydraulic motor 26 operatively attached to rotate the rear support roller 20 of the conveyor.

The surface of the endless belt 14 is provided with a plurality of upstanding rows of flexible fingers 27 which engage the fruit transported on the belt to prevent any substantial rolling of the fruit during movement by the belt rearwardly along the length of the tractor body. The front end of the conveyor with collector 13 may be raised or lowered by hydraulic cylinder 12 to pivot conveyor section 10 about point 28 and locate the collector 13 at a desired height for receipt of fruit from the discharge conveyor of a conventional mechanical harvester, not shown.

Pivotally attached to the rear end of conveyor section 10 for movement about a horizontal axis is a flexible transfer chute 29, which may be suitably constructed of rubber or the like, to pass the fruit on conveyor section 10 onto the surface of a second conveyor section 30 (FIGS. 1 and 2) which is supportably attached to a trailer 32 FIG. 2 of the fruit handling apparatus. Trailer 32 is removably attached to the tractor by means of a draw bar 34 (FIG. 5) with hydraulic lift attachment 36 (FIGS. 5 and 6), the purpose of which will be explained.

As seen in FIG. 2, trailer conveyor section 30 comprises an endless, flexible belt 40 suitably mounted for rearward movement along a generally horizontal path of travel by end rollers 42, 44, the forward roller 42 of which is rotatably driven by means of a hydraulic motor 46. As best seen in FIG. 2, positioned alongside the length of the second conveyor belt 40 are a plurality of bin fillers 48, each of which communicates with the upper surface of the conveyor belt 40 through an opening provided in the upstanding sidewall 50 of the conveyor section 30. A plurality of adjustably moveable deflector means 52, 54, 56 are positioned adjacent the rear side of each of the conveyor sidewall openings into the first three bin fillers, while a stationary deflector bar or blade 58 is positioned adjacent the rear side of the opening of the last bin filler along the length of movement of the conveyor section. Each of the moveable deflector means 52, 54, 56 is operated by a D.C. motor units 59, which is electrically connected to the electrical power unit of the tractor T to selectively deflect fruit passing along the upper surface of the endless belt 40 into one or more of the bin fillers as will be explained.

Positioned alongside and below the trailer conveyor section 30 on a roller conveyor 60 are a plurality of fruit collecting storage bins or boxes 62, each of which communicates with a respective bin filler 48 for collecting the fruit passing therefrom.

Construction and operation of each of the positionably adjustable deflector means 52, 54, 56 may best be described by reference to FIG. 2 and FIG. 4, which is a transverse cross sectional view of deflector means 52 taken generally along line IV—IV of FIG. 2, looking in the direction of the arrows. As seen, each deflector blade mechanism comprises a vertical plate 63 which extends diagonally across the upper fruit-conveying surface of the endless belt 40 of conveyor section 30 and is supportably attached at its upper edge to a rectangular support tube 64 mounted for sliding telescopic movement in a rectangular tube guide 66. Tube guide 66 is provided with a lower longitudinal slot 67 through which plate 63 extends. Attached to the vertical face of the deflector plate along the upper portion thereof is a drive chain element 68 which is engaged by drive sprocket 70 mounted on a vertical shaft 72 which in turn is connected by means of a gear train arrangement 74 to a reversible D.C. motor 59. Motor 59 provides power to retract and extend the deflector plate 63 across the conveyor belt 40 to selectively deflect fruit passing along the conveyor belt into one or more of the bin fillers during the collection operation. As best illustrated in FIG. 2, each deflector plate 63 may be selectively positioned by its respective D.C. motor to extend completely or partially across the width of the conveyor belt to divert a portion or all of the fruit passing along the belt into a desired bin filler and its respective collection bin. Attached to the end of each of the deflector plates 63 is a closure plate 78 which extends parallel to the direction of movement of the conveyor belt 40 and serves to close the opening into the bin filler mechanism when the deflector plate is fully retracted from deflecting position across the conveyor belt.

The construction and operation of each of the identical bin fillers 48 of the fruit handling apparatus of the present invention may be best described and explained by reference to FIG. 2 and FIG. 3, which is a right-end elevation view of the trailer as seen in FIG. 2. Each bin filler 48 comprises an upstanding support frame 80 which is suitably attached to the trailer and supports, for vertical movement, a generally rectangular, box-shaped enclosure housing 82 which serves as an elevator section containing a plurality of horizontally and vertically staggered. diagonally disposed plates 84 which form a sinuous or zig-zag passageway through elevator 82 for directing fruit into the receiving bin therebelow. Each of the plates 84 is vertically spaced from its next adjacent plate to provide a minimum fall distance for fruit passing gravitationally downwardly though the elevator section into the collection bin, and the walls of the passageway and each plate 84 are suitably padded with a thin resilient layer of rubber or the like to cushion the fall and roll of the fruit and minimize bruising thereof during collection.

As each storage bin 62 is being filled with fruit, the elevator section 82 for the bin is vertically raised, in stages, to maintain the lower outlet end 85 of the elevator section adjacent the upper surface of the level of the fruit in the bin. As best seen in FIG. 3, the elevator section is raised and lowered by means of a suitable cable and pulley arrangement connected to a reversible DC motor 88 (FIG. 2) mounted on the support frame of each bin filler. As shown, one end 90 of cable 86 is attached to the upper end of the elevator section 82 and extends by means of pulleys 94 on the support frame to a drive shaft 96 of the DC motor 88 (FIG. 2) where the cable is wound or unwound therefrom to raise and lower the elevator section. Attached to the cable behind the elevator section is a counterweight 98 which offsets the weight of elevator section 82 and facilitates raising and lowering of the section by the DC motor.

To avoid "mounding" and provide for uniform filling in each bin, the upper surface of the lowermost plate of each elevator section is provided with a center-to-side sloping surface 84a which directs the fruit passing out of the lower outlet 85 of the sinuous passageway in forward and rearward directions into the collection bin.

The hydraulic conveyor drive motors, the reversible DC deflector blade motors, and the DC bin filler motors are all suitably connected by electrical and hydraulic lines (not shown) to the hydraulic and electrical system of the farm tractor T and their operation may be controlled by the tractor operator through a suitable control panel (not shown) located adjacent the operator position on the tractor. Alternatively, control could be carried out by a second workman standing on the trailer 32 from a control panel suitably located on the trailer. If desired, the fruit collected on the conveyor section 30 may be selectively directed into one or more of the collection bins by visual observation and manual control of the tractor operator. Alternatively, the electrical and hydraulic control of the collection apparatus may be automatically operated in response to suitable sensing devices, such as a photoelectric cell or mechanical wire feeler device positioned on each bin filler support frame adjacent the fill level of the collection bin. Although the invention has been described and illustrated by the use of a trailer carrying four bulk storage bins for the fruit, it should be understood that the trailer may be designed and constructed to carry more or less bins, as desired, for the collecting operation.

In typical operation, the tractor with associated conveyor and trailer conveyor unit is driven behind a conventional fruit harvester with the receiving scoop 13 of the first conveyor section 10 located in position to receive fruit from the discharge conveyor of the harvester as it moves along the rows of orchard trees. Fruit passing from the collector scoop onto the tractor conveyor section conveyor belt 14 is lifted by flexible fingers 27 and is gravitationally discharged therefrom by flexible chute 29 onto the trailer conveyor section 30. To facilitate free turning movement of the tractor T during fruit collection and to facilitate discharge of the filled bins from the trailer, transfer chute 29 is pivotally connected for upward and downward movement, as well as slight lateral displacement during the harvesting operation. Fruit passing along the trailer conveyor 30 is selectively deflected by the deflector plate 63 which are operated by the tractor driver to direct the fruit into one or more of the bin fillers 48 and collecting bins 62. As can be appreciated, each deflector plate 63 may cover the entire width of the conveyor belt 40 or any selected part thereof, or it may be retracted completely leaving the fruit free to move to the next collecting bin.

After the collection bins 62 on trailer 32 have been filled, the trailer is transported by the tractor to a central collection site in the orchard. As best illustrated in FIG. 5, the bins may be removed from the trailer unit without the necessity of manual labor, by means of hydraulic lifting mechanism 36 which connects the trailer to the draw bar 34 of the tractor T. The lifting mechanism comprises a first yoke member or frame 100 which is pivotally attached at one end to the trailer unit and pivotally attached at the other end to the hitch 34 of the tractor. A hydraulic piston 102 may be connected to and operated from the tractor unit hydraulic system to lift the front end of the trailer relative to the hitch and yoke unit and thereby lower the rear end of the trailer until it strikes the ground, causing a latch mechanism 104, 106 (FIG. 2) at the rear of bin conveyor 60 to release the rearmost bin 62 and allow the bins to roll off of the conveyor onto the ground as the tractor is moved slowly forward. Empty bins may then be placed on the trailer bin conveyor 60 and the tractor returned to the orchard for further fruit collecting operations. To provide continuous harvesting with the mechanical harvester, it is contemplated that two tractors and trailer conveyor units of the type herein described may be employed with each mechanical harvester to maintain continuous operation of the harvester.

From the foregoing description of the preferred embodiment of the invention, it can be seen that the present invention may be utilized by orchard growers in connection with conventional farm tractor equipment and without the necessity for investment in expensive motorized collection equipment which otherwise would be unusable in other farm operations.

That which is claimed is:

1. Orchard fruit handling apparatus for conveying and delivering harvested fruit into a plurality of storage bins comprising first conveyor means for transporting fruit received thereon in a generally linear direction, means for attaching said first conveyor means to extend along the side of a farm tractor to be transported thereby, said first conveyor means including a forward end portion for receiving harvested fruit and a rear end portion including chute means for gravitationally discharging the fruit therefrom; and trailer means for attachment to the rear of a farm tractor to be transported thereby, said trailer means including second conveyor means having a fruit-conveying surface positioned for receiving fruit from said chute means and for transporting the fruit in a generally horizontal linear path of travel along said trailer means, support means on said trailer means positioned beside and below said fruit-conveying surface of the second conveyor means and extending along the length thereof for supportably receiving a plurality of fruit storage bins in juxtaposed linear relation beside and below said second conveyor means, a plurality of bin filler means positioned in linear relation alongside said second conveyor means and above said bin support means for selectively receiving fruit discharged from said fruit conveying surface of the second conveyor means and defining a sinuous fruit-receiving passageway having a lower discharge outlet for gravitationally delivering fruit into corresponding storage bins located on said bin support means, and deflector means operatively connected to said second conveyor means for extending across said fruit-conveying surface thereof to deflect fruit from said surface into said bin filler means, said deflector means including means for moving said deflector means into and out of a fruit-deflecting position across said second conveyor surface whereby fruit may be selectively deflected into one or more of said bin filler means.

2. Apparatus as defined in claim 1 wherein said fruit storage bin support means of said trailer means comprises an elongate roller conveyor extending generally parallel to and below said second conveyor means for receiving a plurality of storage bins, and means for tilting said roller conveyor about its transverse axis to permit gravitational discharge of fruit storage bins from said roller conveyor.

3. Apparatus as defined in claim 1 wherein each of said bin filler means comprises a generally rectangular enclosure housing containing a plurality of diagonally disposed plates positioned in horizontally and vertically staggered relation to define said sinuous fruit-receiving passageway, and means for selectively raising and lowering said rectangular enclosure housing to maintain said lower discharge outlet of said fruit-receiving passageway at the level of fruit being collected in a corresponding storage bin located on said bin support means.

4. Apparatus as defined in claim 3 wherein said enclosure housing and said diagonally disposed plates therein include cushioning means on their fruit-receiving surfaces to cushion the fall of fruit passing through said fruit-receiving passageway and minimize bruising of the fruit during its collection in a corresponding storage bin.

5. Apparatus as defined in claim 1 wherein each of said plurality of bin filler means comprises a support frame attached to said trailer means, an elevator section mounted for vertical movement on said support frame and including a generally rectangular housing containing a plurality of diagonally disposed plates positioned in horizontally and vertically staggered relation to define said sinuous fruit-receiving passageway, said rectangular housing having an open side facing said second conveyor means, and means for moving said generally rectangular housing upwardly and downwardly on said support frame to position selected of said diagonally disposed plates adjacent the fruit-conveying surface of said conveyor means to receive fruit into said sinuous passageway, whereby the discharge outlet of said passageway may be selectively located adjacent the upper level of the fruit as it is collected in a corresponding storage bin located on said bin support means.

6. Apparatus as defined in claim 5 wherein said means for moving said generally rectangular housing upwardly and downwardly on said support frame comprises motor means mounted on said support frame, cable means having one end attached to said rectangular housing and the other end attached to said motor means, and pulley means attached to said support frame and supportably positioning said cable means for linear movement between said rectangular box and said motor means, and weight means attached to said cable means intermediate its length to counterbalance the weight of said rectangular housing during its upward and downward movement on said support frame.

7. Apparatus as defined in claim 1 wherein said deflector means comprises deflector plate means located adjacent at least certain of said bin filler means and moveable into and out of fruit deflecting position across said fruit-conveying surface of the second conveyor means to direct fruit passing along said surface into said sinuous fruit-receiving passageway said bin filler means, and motor means for moving said deflector plate means into and out of selected positions across said conveying surface during filling of fruit storage bins located on said bin support means.

8. Apparatus as defined in claim 7 wherein said second conveyor means includes a generally vertical side wall extending alongside said fruit-conveying surface between said surface and said plurality of bin-filler means, an opening in said side wall adjacent each bin filler means to permit communication of said conveyor surface and said bin filler means, and wherein said deflector plate includes closure plate means to close said side wall opening when said deflector plate means is out of deflecting position across the fruit-conveying surface of said second conveyor means.

9. Apparatus as defined in claim 1 wherein said means for attaching said first conveyor means to a farm tractor includes means for adjustably positioning said forward end portion thereof at different elevations to receive harvested fruit, and wherein said first conveyor means includes a fruit-conveying surface having upstanding flexible elements to maintain the position of fruit being conveyed on said surface.

* * * * *